(12) United States Patent
Henttu (10) Patent No.: US 7,266,166 B2
(45) Date of Patent: Sep. 4, 2007

(54) METHOD AND ARRANGEMENT FOR INTERFERENCE ATTENUATION

(75) Inventor: Pertti Henttu, Varjakka (FI)

(73) Assignee: Nokia Corporation, Espoo (FI)

( * ) Notice: Subject to any disclaimer, the term of this patent is extended or adjusted under 35 U.S.C. 154(b) by 618 days.

(21) Appl. No.: 10/468,479

(22) PCT Filed: Feb. 22, 2002

(86) PCT No.: PCT/FI02/00148

§ 371 (c)(1),
(2), (4) Date: Aug. 20, 2003

(87) PCT Pub. No.: WO02/073817

PCT Pub. Date: Sep. 19, 2002

(65) Prior Publication Data

US 2004/0071103 A1    Apr. 15, 2004

(30) Foreign Application Priority Data

Feb. 23, 2001    (FI) .................................. 20010367

(51) Int. Cl.
*H04L 25/08* (2006.01)
*H04B 1/10* (2006.01)
(52) U.S. Cl. ...................... 375/346; 375/148
(58) Field of Classification Search ................ 375/285, 375/246, 316, 130, 140, 144, 147, 148, 346; 370/335, 342, 441
See application file for complete search history.

(56) References Cited

U.S. PATENT DOCUMENTS

| | | | |
|---|---|---|---|
| 6,011,430 A * | 1/2000 | Kim ............................ 327/551 |
| 6,246,732 B1 * | 6/2001 | Kobayashi et al. ......... 375/346 |
| 6,385,261 B1 * | 5/2002 | Tsuji et al. .................. 375/346 |
| 6,665,526 B2 * | 12/2003 | Tsuji et al. .................. 455/296 |
| 6,801,161 B2 * | 10/2004 | Lehtomaki et al. ......... 342/377 |

(Continued)

FOREIGN PATENT DOCUMENTS

EP    1 077 551    2/2001

OTHER PUBLICATIONS

"Cyclic SVD Method for Broadband Interference Cancellation in FH/DS Communications", P. Henttu, Sixth International Symposium on Spread Spectrum Techniques and Applications, Sep. 6-8, 2000, vol. 1, pp. 68-72.

(Continued)

*Primary Examiner*—Tesfaldet Bocure
(74) *Attorney, Agent, or Firm*—Squire, Sanders & Dempsey, LLP (57) ABSTRACT

A method and apparatus are provided including setting an interference level threshold, to sample the received signal, storing the sample values as first sample value vectors of a predetermined length, and forming prediction matrices of the first sample value vectors. The method and apparatus also modify prediction matrices in such a way that the interference components and the components of the desired signal are separated from each other, form signal matrices by performing rank reduction for each prediction matrix by rejecting those sample values or elements representing them that exceed the interference level threshold, form second sample value vectors of the signal matrices, and sum up sample values of second sample value vectors time-coherently to average the noise by sliding the sample value window, to be used to attenuate interference in the system.

21 Claims, 5 Drawing Sheets

U.S. PATENT DOCUMENTS

2002/0015459 A1* 2/2002 Happonen et al. .......... 375/346
2004/0022228 A1* 2/2004 Tyra et al. ................. 370/342

OTHER PUBLICATIONS

"Blind SVD Based Interference Suppressor in Spread Spectrum Communications", P. Henttu et al, CISS' 99 33rd Annual Conference on Information Sciences and Systems, Baltimore, Maryland, Mar. 17-19, 1999.

"Effective Interference Suppression Using Short Overlapping Regions of Data and SVD", P. Henttu, IEEE International Conference on Communications, 2002, ICC 2002, vol. 1, Apr. 28-May 2, 2002, pp. 182-186.

"Mathematical Methods and Algorithms for Signal Processing", Moon et al, Library of Congress Cataloging-in-Publication Data, Prentice Hall, 2000, Chapter 7, The Singular Value Decomposition, pp. 369-372.

Abstract of "Performance of the Excision CFAR Detector in the Presence of Interferers", H. Goldman, IEE Proc. F, Radar Signal Process, UK, Jun. 1990.

Abstract of "A Novel Beamformer with Multiple Signal Reception for GPS Receivers", Lin et al, 2000 IEEE-APS Conference on Antennas and Propagation for Wireless Communications (Cat. No. 00EX380), Waltham, MA, USA, Nov. 6-8, 2000.

Abstract of European No. 0946072 dated Sep. 29, 1999.

* cited by examiner

METHOD AND ARRANGEMENT FOR INTERFERENCE ATTENUATION

FIELD OF THE INVENTION

The invention relates to a method and an arrangement for interference attenuation in a wideband telecommunications system.

BACKGROUND OF THE INVENTION

On the radio path, both AWGN, i.e. additive white gaussian noise, and different interference signals or fading multipath-propagated signal components of different signals are summed up in the desired signal. Interferences are usually caused inadvertently by other systems or other users of the same system, but they can also be caused deliberately. There have been attempts to eliminate or attenuate interferences with for instance different coding-decoding methods, channel equalizers and filtering. However, it has been problematic to find a sufficiently efficient noise-attenuation method that would be applicable to wideband telecommunications systems. The problem has specifically been to find such a method that would efficiently attenuate also relatively wideband interference in wideband data transmission systems.

Singular value decomposition, i.e. SVD, refers to numeric signal processing applied to several objects of use, such as spectral analysis, design of filters, and reduction and estimation of model orders. Singular value decomposition can be applied directly to processing data matrices, and it is applicable to both real and complex value matrices. Singular value decomposition is described in more detail in publication by Todd K. Moon, Wynn C. Stirling: *Mathematical Methods and Algorithms for Signal Processing*, Prentice Hall, 2000, which is incorporated as reference herein.

BRIEF DESCRIPTION OF THE INVENTION

An object of the invention is to implement an improved method of attenuating particularly such interference that is not previously known. This is achieved with a method of attenuating interference in a wideband telecommunications system. The method comprises setting an interference level threshold; sampling the received signal; storing the sample values as first sample value vectors of a predetermined length, forming prediction matrices of the first sample value vectors; modifying prediction matrices in such a way that the interference components and the components of the desired signal are separated from each other; forming signal matrices by performing rank reduction for each prediction matrix by rejecting those sample values or elements representing them that exceed the interference level threshold; forming second sample value vectors of the signal matrices, the second sample value vectors being at least substantially of the same length as the first sample value vectors; summing up sample values of second sample value vectors time-coherently to average the noise by sliding the sample value window, the length of which is determined preferably by the length of the first sample value vectors.

Further, an object of the invention is a receiver in a wideband telecommunications system, implementing the method, interference being attenuated in the receiver. The receiver comprises means for setting an interference level threshold; the receiver comprises means for sampling the received signal; the receiver comprises means for storing the sample values as first sample value vectors of a predetermined length; the receiver comprises means for forming prediction matrices of the first sample value vectors; the receiver comprises means for modifying prediction matrices in such a way that the interference components and the components of the desired signal are separated from each other; the receiver comprises means for forming signal matrices by performing rank reduction for each modified prediction matrix by rejecting those sample values or elements representing them that exceed the interference level threshold; the receiver comprises means for forming second sample value vectors of the signal matrices, the second sample value vectors being at least substantially of the same length as the first sample value vectors; the receiver comprises means for summing up sample values of second sample value vectors time-coherently to average the noise by sliding the sample value window, the length of which is determined preferably by the length of the first sample value vectors.

Preferred embodiments of the invention are disclosed in the dependent claims.

The invention is based on the idea that the sample values taken from the received signal are stored as vectors of a desired length, of which data matrices are formed, being called prediction matrices. The prediction matrices are modified in such a way that the interference components and the components of the desired signal are separated from each other. This can be implemented for example by factorizing the matrix by means of singular value decomposition. Next, those sample values, elements representing the sample values or, in the case of signal value decomposition, singular values and corresponding singular vectors that exceed the set interference level threshold are rejected. In this way, rank reduction is preferably performed for the matrix in accordance with the Eckhart-Young theorem. Next, new sample value vectors are formed using the remaining values. In this way, interference summed up in the signal in the channel can be attenuated. Finally, noise is averaged by adding up sample values in a time-coherent manner.

A plurality of advantages is achieved with the method and system according to the invention. Interference in a receiver of a wideband system can be efficiently attenuated with the method of the invention. Relatively wideband interference not known in advance can also be removed by means of the method of the invention by determining a sliding sample value window to be of an appropriate size relative to the interfering system: with a narrow sample value window, the momentary relative bandwidth of the interference can be made narrow compared with the bandwidth of the desired signal.

BRIEF DESCRIPTION OF THE FIGURES

The invention will now be described in greater detail in connection with preferred embodiments, with reference to the attached drawings, in which.

DESCRIPTION OF EMBODIMENTS

The solution according to the invention is particularly applicable to the MC-CDMA (Multi Carrier Code Division Multiple Access) radio system utilizing direct sequence (DS) technique. Other objects of application can include satellite systems, military telecommunications systems and private non-cellular networks. The solution according to the invention is not confined to these, however.

The following example illustrates preferred embodiments of the invention in the UMTS (Universal Mobile Telephone System) without, however, restricting the invention thereto.

The structure of a mobile system is described with reference to FIG. 1. The main parts of the mobile system are a core network CN, a UMTS terrestrial radio access network UTRAN and user equipment Ue. The interface between the CN and the UTRAN is called Iu, the interface between the UTRAN and the Ue being called Uu.

UTRAN is formed of radio network subsystems RNS. The interface between the RNSs is called Iur. The RNS is formed of a radio network controller RNC and of one or more nodes B. The interface between the RNC and B is called Iub. The coverage area of the node B, i.e. the cell, is denoted by C in the figure.

Figure 1:
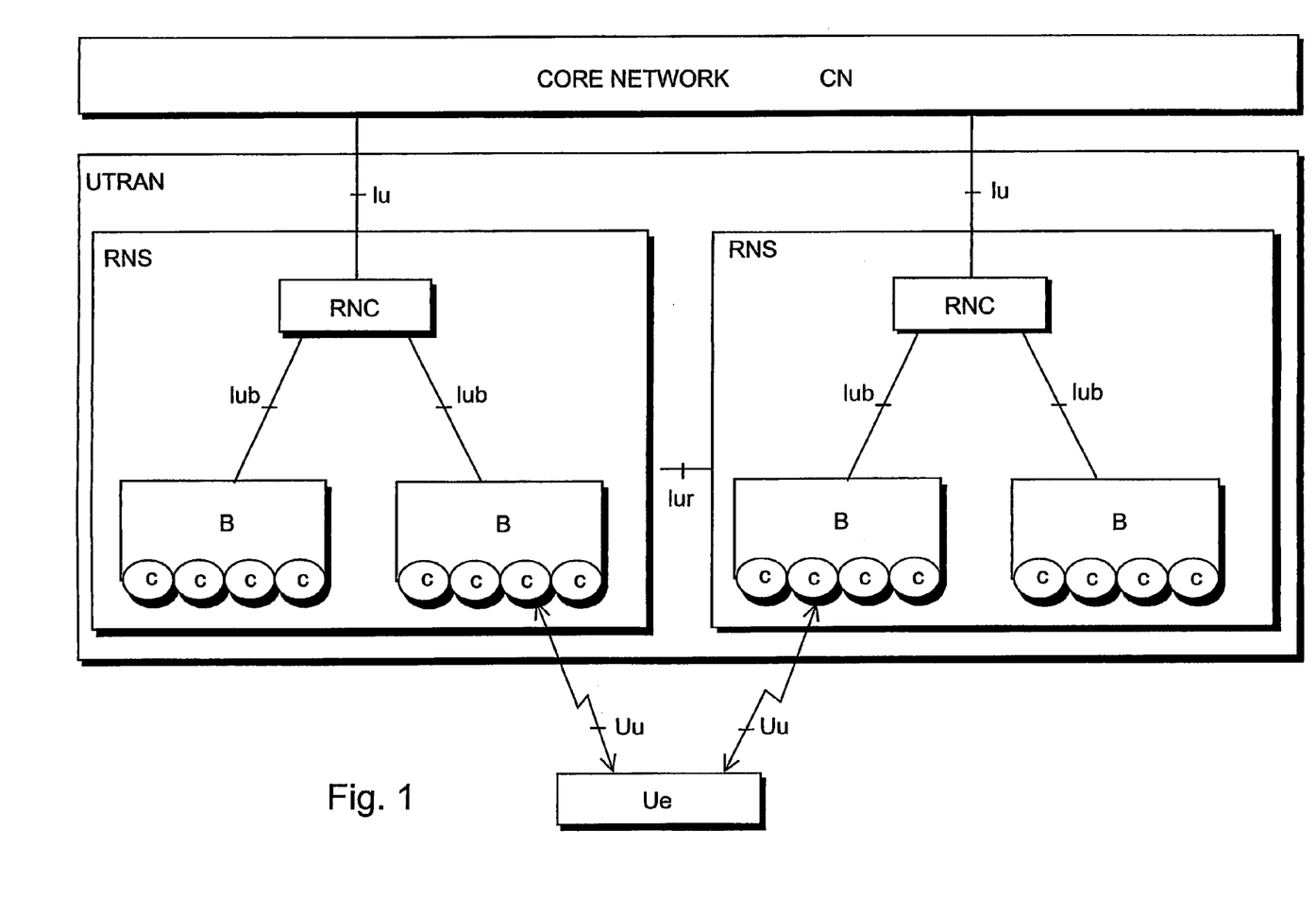
FIG. 1 shows an example of a telecommunications system.
Figure 2:
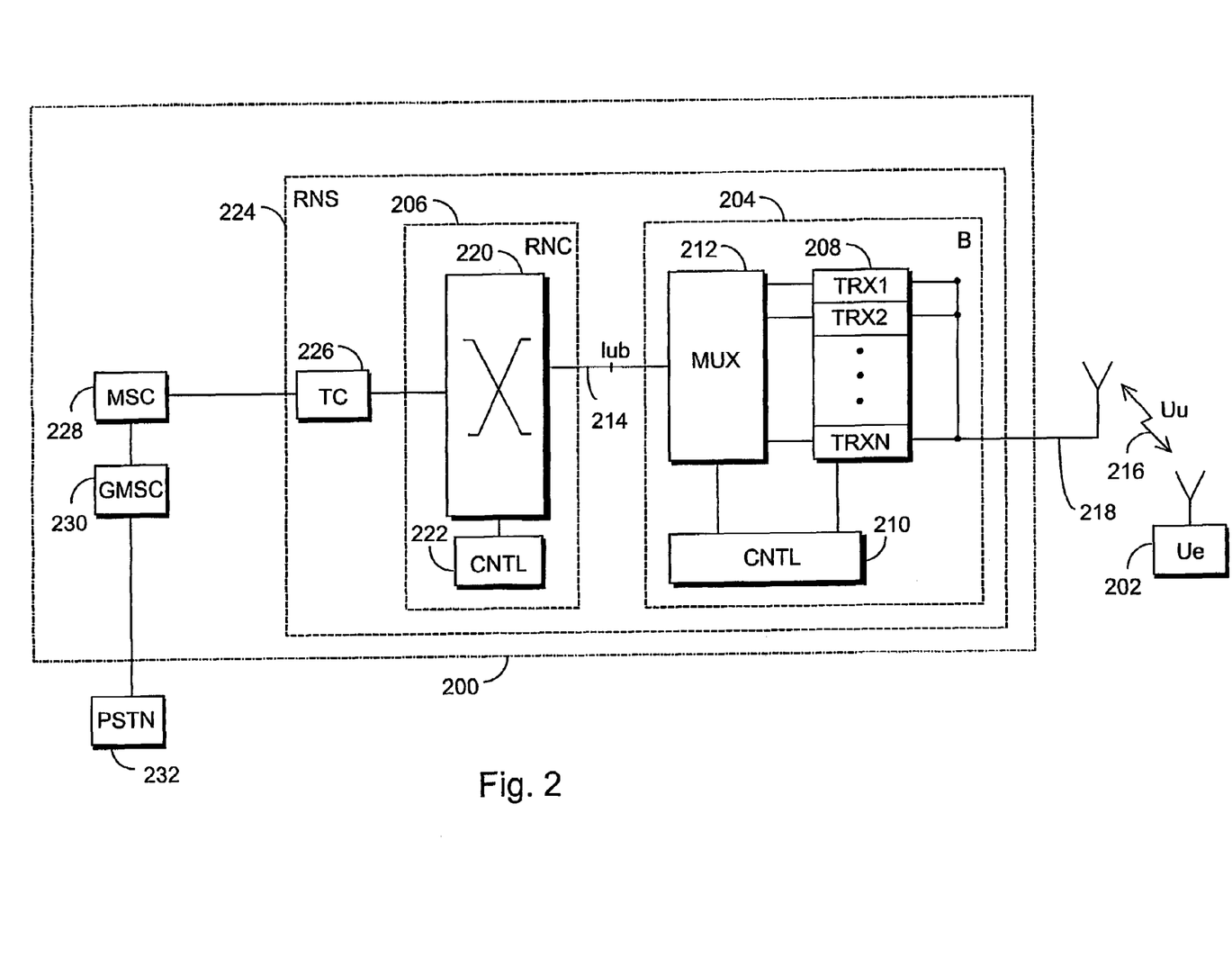
FIG. 2 shows a second example of a telecommunications system.

The description shown in FIG. 1 is at rather a general level so that FIG. 2 shows a more detailed example of a cellular radio network. FIG. 2 contains only the most essential blocks, but it will be obvious to a person skilled in the art that a conventional cellular radio network also includes other functions and structures, the more detailed description of which is not necessary herein. The details of the cellular radio network may deviate from those shown in FIG. 2, but with regard to the invention, these differences have no significance.

Thus, the cellular radio network typically comprises the infrastructure of a fixed network, i.e. a network part 200, and user equipment units 202, which can be fixedly positioned, positioned in a vehicle, or portable terminals, such as mobile phones or portable computers that allow a connection to a radio telecommunications system. The network part 200 comprises base stations 204. The base station corresponds to the node B in the preceding figure. A radio network controller 206 connected to the base stations, in turn, controls several base stations 204 in a centralized manner. The base station 204 comprises transceivers 208 and a multiplexer unit 212.

The base station 204 further comprises a control unit 210 which controls the operation of the transceiver 208 and the multiplexer 212. By means of the multiplexer 212, the traffic and control channels used by several transceivers 208 are positioned on one transmission link 214. The transmission link 214 forms the interface Iub.

There is a connection from the transceiver 208 of the base station 204 to an antenna unit 218, by means of which a radio connection 216 is implemented to the user equipment 202. In the radio connection 216, the structure of the frames to be transferred is determined in a system-specific manner and is called an air interface Uu.

The radio network controller 206 comprises a group-switching network 220 and a control unit 222. The group switching network 220 is used for switching speech and data and for connecting signalling circuits. A radio network subsystem 224 formed by the base station 204 and the radio network controller 206 further comprises a transcoder 226. The transcoder 226 is usually positioned as close to the mobile services switching centre 228 as possible, because speech can then be transmitted between the transcoder 226 and the radio network controller 206 in the form of a cellular radio network in such a way that transmission capacity is saved.

The transcoder 226 converts the different digital speech coding modes used between the public switched telephone network and the mobile telephone network to be compatible with each other, for example from the fixed-network mode into another mode of a cellular radio network, or vice versa. The control unit 222 performs call control, mobility management, collection of statistical data and signalling.

FIG. 2 further illustrates a mobile services switching centre 228 and a gateway mobile services switching centre 230, which is responsible for the connections of the mobile telephone system to the outside world, in this case to a public switched telephone network 232.

Figure 3:
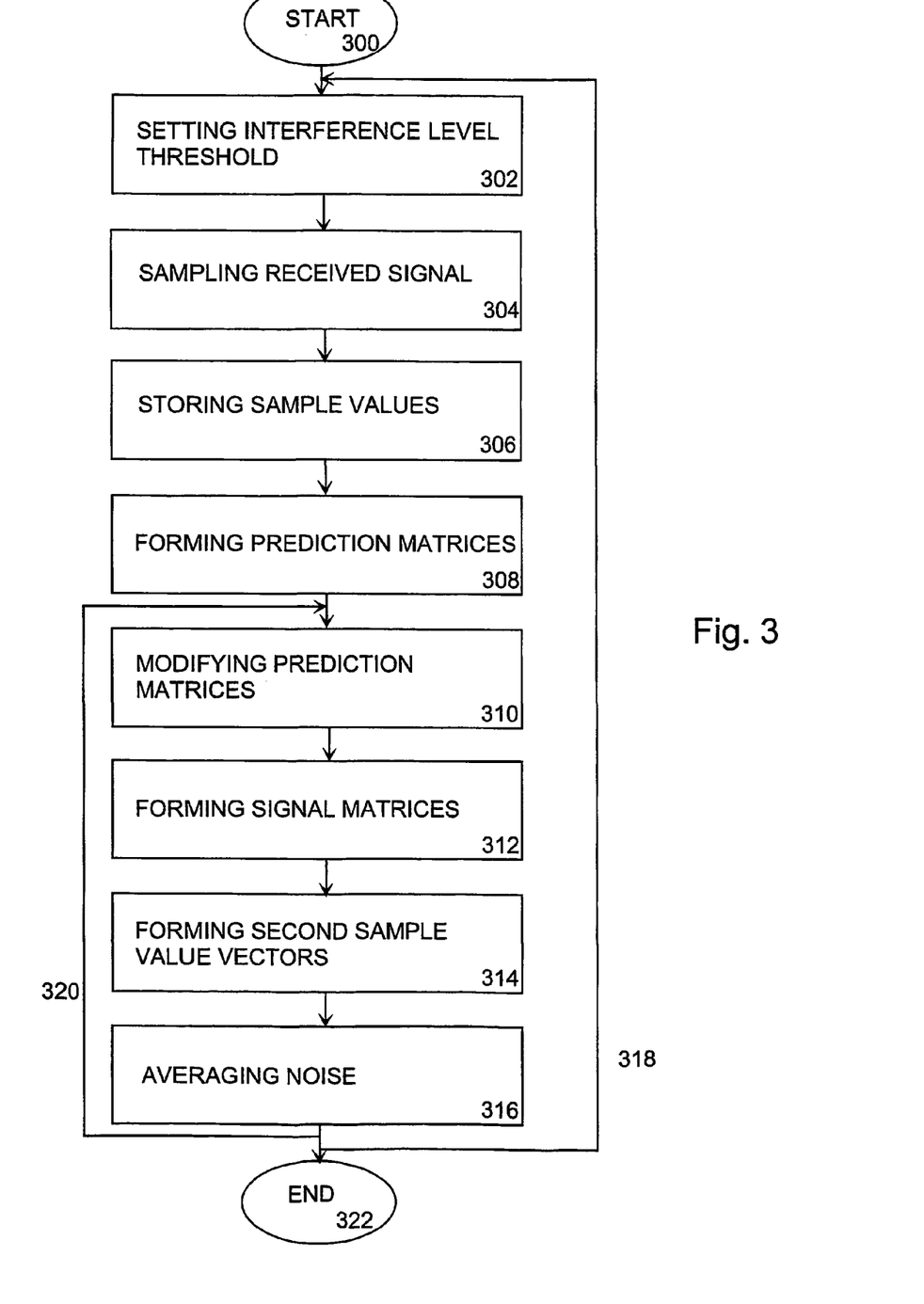
FIG. 3 shows a flow chart of the method steps for attenuating interference in a wideband telecommunications system.

FIG. 3 shows a flow chart of the method steps for attenuating interference in a wideband telecommunications system, such as in WCDMA systems. The method is applicable to removing interference of many types in wideband systems by adjusting the width of the sample window used in the method. In one embodiment of the method, interference attenuation is performed separately for each sample vector, so that the method can also be applied to a parallel interference attenuation arrangement.

Performing the method starts from a block 300. In a block 302, an interference level threshold is set. The interference level threshold can be set in advance, or the interference level threshold can be changed. Determination of the interference level threshold can be based on for example measurements performed in the network, advance information on the interfering system or the aim set for the bit error ratio. For instance, if the interfering system is frequency-hopping, the interference level of the channel can be measured when it is known that the interference signal is not on this particular frequency band, and then the interference level threshold can be set according to the measurement results received.

In a block 304, the received signal is sampled by means of a method according to the prior art. The received signal is composed of a desired signal, noise and interference. The sampling frequency is preferably one sample per chip, i.e. symbol of a spreading code. If the sampling frequency is something else, the samples can be stored in a buffer memory.

In a block 306, the baseband sample values are stored as first sample value vectors of a predetermined length. The length of the sample value vectors can be selected freely to be suitable for each system.

In a block 308, a prediction matrix is formed of each sample value vector. In the following, one possible example of forming one prediction matrix is described when 8 samples have been taken from the received signal, in other words when the length of the sample value vector is 8. The first line in the matrix contains samples 1 to 6 of each sample value vector, the next one containing samples 2 to 7 and the third one containing samples 3 to 8. Thus, the sample vector is slid forwards sample by sample until all elements of one sample vector have been positioned in the matrix. After this, the complex conjugate values are positioned in the matrix in the reverse order, i.e. at first the complex conjugate values of the samples 6 to 1, the complex conjugate values of the samples 7 to 2 on the next line, and the complex conjugate values of the samples 8 to 3 on the last line. This yields the following matrix as the prediction matrix A $$A = \begin{bmatrix} r(1) & r(2) & r(3) & r(4) & r(5) & r(6) \\ r(2) & r(3) & r(4) & r(5) & r(6) & r(7) \\ r(3) & r(4) & r(5) & r(6) & r(7) & r(8) \\ \tilde{r}(6) & \tilde{r}(5) & \tilde{r}(4) & \tilde{r}(3) & \tilde{r}(2) & \tilde{r}(1) \\ \tilde{r}(7) & \tilde{r}(6) & \tilde{r}(5) & \tilde{r}(4) & \tilde{r}(3) & \tilde{r}(2) \\ \tilde{r}(8) & \tilde{r}(7) & \tilde{r}(6) & \tilde{r}(5) & \tilde{r}(4) & \tilde{r}(3) \end{bmatrix} \quad (1)$$

In a block 310, the prediction matrices are modified in such a way that the interference components and the desired-signal components are separated from each other. This can be implemented by, for example, diagonalization or factorization of the matrix. The diagonalization can be implemented for instance by means of eigendecomposition, which is, however, applicable to square matrices only. Factorization can preferably be implemented by means of singular value decomposition (SVD). With singular value decomposition, the data matrix can be divided into factors, from which interference compositions and desired-signal compositions can be separated. SVD is applicable to all kinds of matrices, also other than square matrices. By means of singular value decomposition, the matrix A can be presented as follows $$A = U\Sigma V^* \quad (2)$$

where matrices U and V are unitary matrices and $\Sigma$ is a diagonal matrix comprising singular matrices of the matrix A. In general, the singular values are in a descending order. The asterisk denotes a complex conjugate transpose of the matrix. The 6×6 matrix in the exemplary case yields singular decomposition in which all matrices U, V and $\Sigma$ are 6×6 matrices.

In a block 312, signal matrices are formed by performing rank reduction for each modified prediction matrix by rejecting the sample values, the elements representing them or the singular values that exceed the set interference level threshold. The rank reduction can be performed by utilizing the Eckhart-Young theorem, which yields the best least square estimate of the desired signal.

Figure 4:
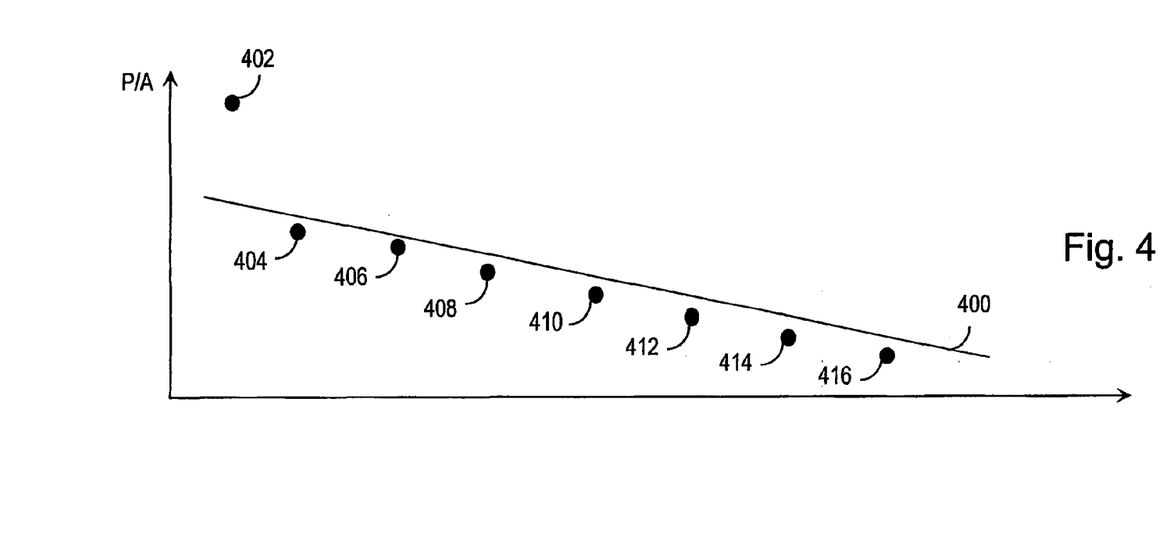
FIG. 4 illustrates an example of rank reduction in the matrix.

In the following, the rank reduction of the matrix is explained with reference to the example of FIG. 4. FIG. 4 shows an example of a typical case, where a wideband system is disturbed by a system which is narrowband in comparison and the power of which is significantly higher than that of the wideband system. The figure shows samples taken from the received signal or elements representing the samples when the interference components and desired-signal components have been separated from each other and shown in the order of magnitude. If the factorization of the matrix has been performed with singular value decomposition, the values in the diagonal form are called singular values. The vertical axis indicates the power or amplitude values, the horizontal axis indicating the samples or elements in the order of magnitude. In FIG. 4, the samples, elements or singular values 404, 406, 408, 410, 412, 414, 416 comprising only a little or no interference are below the set interference level threshold 400; in other words these samples, elements or singular values contain only desired signal or white gaussian noise. By contrast, a sample, element or singular value 402 exceeding the interference level threshold also contains an interference signal that is at least relatively powerful. Thus, the sample, element or singular value 402 is rejected. In accordance with the Eckhart-Young theorem, this sample value or element is rejected from the matrix $\Sigma$, the corresponding columns being rejected from the matrices U and V. A more detailed example of the application of the Eckhart-Young theorem is described in publication by Pertti Henttu, Ari Pouttu: '*Blind SVD Based Interference Suppressor in Spread Spectrum Communications*', which is incorporated as reference herein.

The prediction matrix of the desired signal according to the Eckhart-Young is in the form $$\hat{A} = \sum_{k=1}^{r_s} \sigma_k u_k v_k^* \quad (3)$$

where $r_s$ is the greatest singular value index, which singular value belongs to the estimate of the desired signal.

In a block 314, new sample value vectors are formed of the signal matrices by summing up the sample values or elements of the matrix $\hat{A}$ with the corresponding complex conjugates. Thus, in the case of the matrix shown in Formula (1), the sample value estimate $\hat{r}_1$ yields the value $$\hat{r}(1) = \hat{A}(1,1) + \hat{A}(4,6)^* \quad (5)$$

and the sample estimate $\hat{r}_2$ yields $$\hat{r}(2) = \hat{A}(1,2) + \hat{A}(2,1) + \hat{A}(4,5)^* + \hat{A}(5,6) \quad (6)$$

Other sample value estimates are determined correspondingly. New sample value vectors are formed of the sample value estimates. The above method is preferably repeated for all original sample value vectors.

In a block 316, sample values of second, i.e. new, sample value vectors are summed up to average the interference in a time-coherent manner by sliding the sample value window, the length of which sample value window is preferably determined by the length of first, i.e. the original, sample value vectors. The window is slid by one or more sample values at a time. The size of the sliding step is determined according to each application. In this way, an estimate sampled by means of new sample value vectors can be formed of the received signal, from which at least samples with strong interference have been filtered out and from which the effect of noise has been averaged out.

Figure 5:
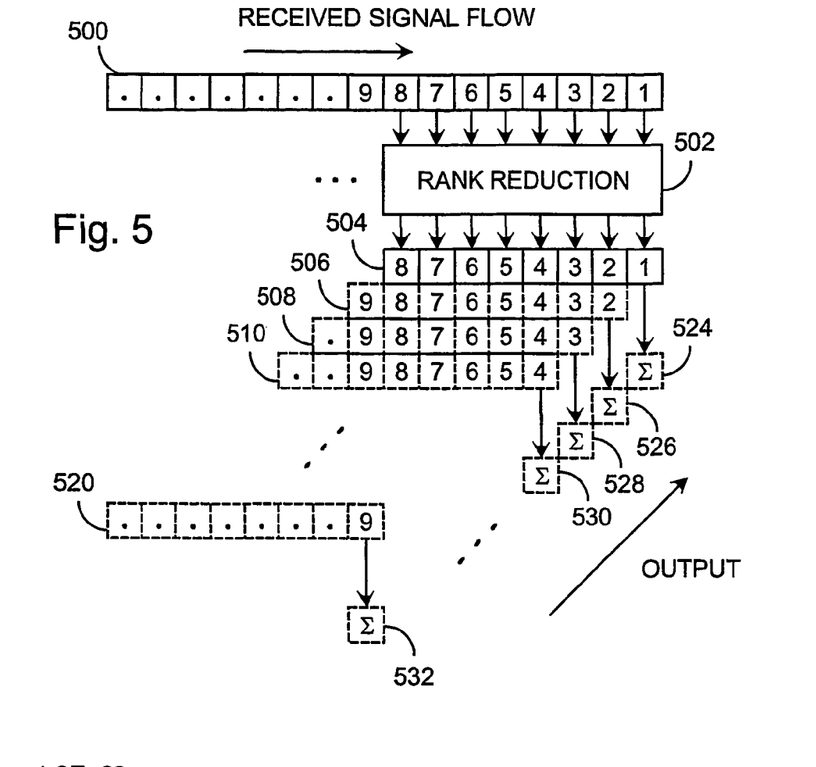
FIG. 5 illustrates an example of averaging noise.

FIG. 5 illustrates an example of noise averaging by sliding the sample value window. FIG. 5 shows, by way of example, only part of the sample value vectors. A sample sequence 500 shows successive samples taken from the received signal. The samples 500 are preferably stored at first in the form of a vector and after that in the form of a matrix for the purpose of diagonalization and rank reduction. The dimensions of the matrices in the example of FIG. 5 are 8×8. The rank reduction of the matrix is performed in a block 502. After the rank reduction, new sample value vectors are formed which comprise samples of a signal with noise. The sample value vectors of FIG. 5 have been formed in accordance with the method described above. A first element 524 of the interference-attenuated and noise-attenuated estimate vector of the received signal is a sample of a sample vector 504, taken at the moment of time 1. A second element 526 of the interference-attenuated and noise-attenuated estimate vector of the received signal is the sum of the samples of sample vectors 504 and 506, taken at the moment of time 2; a third element 528 is the sum of the samples of sample vectors 504, 506 and 508, taken at the moment of time 3; and a fourth element 530 is the sum of the samples of sample vectors 504, 506, 508 and 510, taken at the moment of time 4. The method is repeated for the next sample block. In FIG. 5, this is illustrated by a ninth element 532 of the estimate vector, which is received by calculating the sum of the samples of sample vectors 506, 508, 510, . . . , 520, taken at the moment of time 9. The sample vectors 504, 506, 508, 510, . . . , 520 can be supplemented with new samples by means of a continuous process, or the samples can be treated block-specifically.

The method illustrated by the flow chart of FIG. 3 can be implemented in a plurality of ways, of which the figure shows two different alternatives. An arrow 318 shows the repeatability of the method as beginning from the setting of the interference level threshold, and an arrow 320 indicates the repeatability of the method as beginning from the modification of the stored estimate matrices. The performance of the method is terminated in a block 322.

Figure 6:
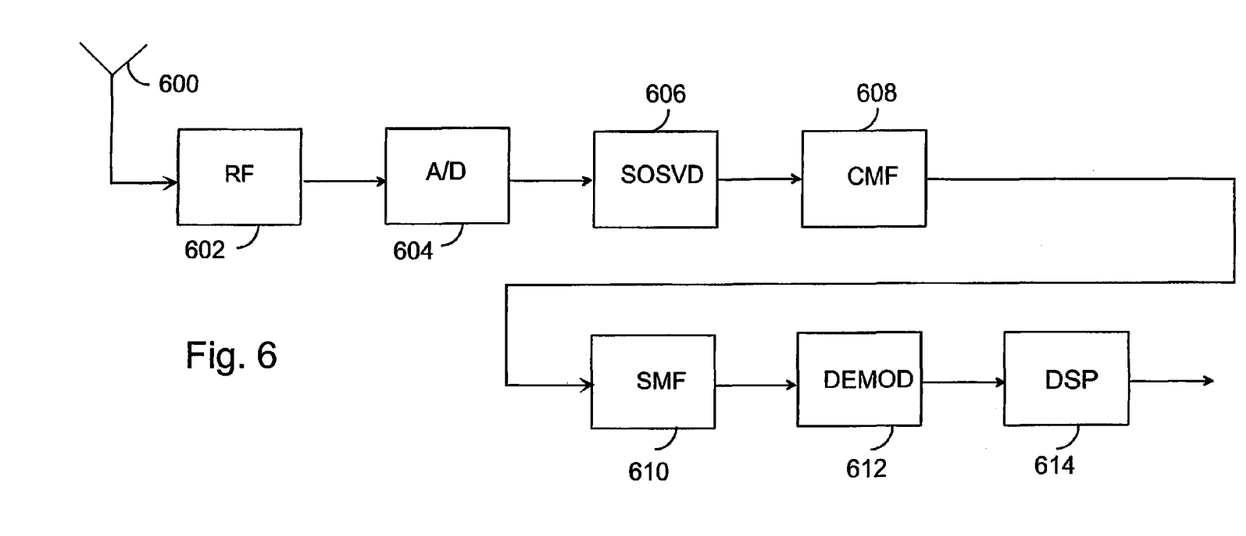
FIG. 6 shows an example of a receiver.

Next, an example of a receiver is described with reference to FIG. 6. FIG. 6 illustrates, for the sake clarity, a simplified example of a receiver at a block diagram level by means of one embodiment. It will be obvious to a person skilled in the art that a transceiver can also comprise parts other than the ones shown in FIG. 6. The receiver shown can be positioned for instance in the base station of a radio system, in a portable communication device, such as a telephone or a handheld computer or another corresponding device.

The receiver comprises an antenna or an antenna array 600 consisting of antenna elements, and RF (Radio Frequency) parts 602 in which the received signal is filtered, down-converted either directly to the baseband frequency or to intermediate frequency, and amplified. Measurements possibly performed to set the interference level threshold can also be performed in the block 602. In a block 604, the signal is converted from analogue into digital by sampling and quantizing. An estimate of the received signal according to the above-described embodiment, from which interference has been attenuated, is formed in a block 606. In this exemplary case, the block 606 also comprises the memory required for storing the signal sample values. The memory block can also be separate. A block 608 comprises a filter matched with the duration of a chip, i.e. a symbol of a spreading code, the filter being also used in code search. The filter matched with the chip of the block 608 can also be positioned before the block 606. In a block 610, a direct-spread wideband signal is despread by filtering it by means of a filter arranged in the spreading code, which filter is used in signal detection and synchronization. In a block 612, the signal is demodulated, and bit decisions are made. The bit decisions can be either hard decisions or soft decisions. A block 614 comprises required signal processing, such as deinterleaving, decoding and decryption.

In a preferred embodiment, the receiver, such as a multifinger receiver of a RAKE type, comprises a delay estimator by means of which the delays of the multipath-propagated components are estimated. The delays of the different RAKE fingers are set to correspond to the delays of the signal components delayed in different ways.

The invention is preferably implemented by software, in which case the terminal comprises one or more microprocessors, the functions according to the described interference attenuation method being implemented by software operating in the microprocessor(s). The invention can also be implemented by hardware solutions providing the required functionality, for instance by utilizing the ASIC (Application Specific Integration Circuit) or separate logic components. It is also to be noted that the method enables the use of parallel processing.

Figure 7:
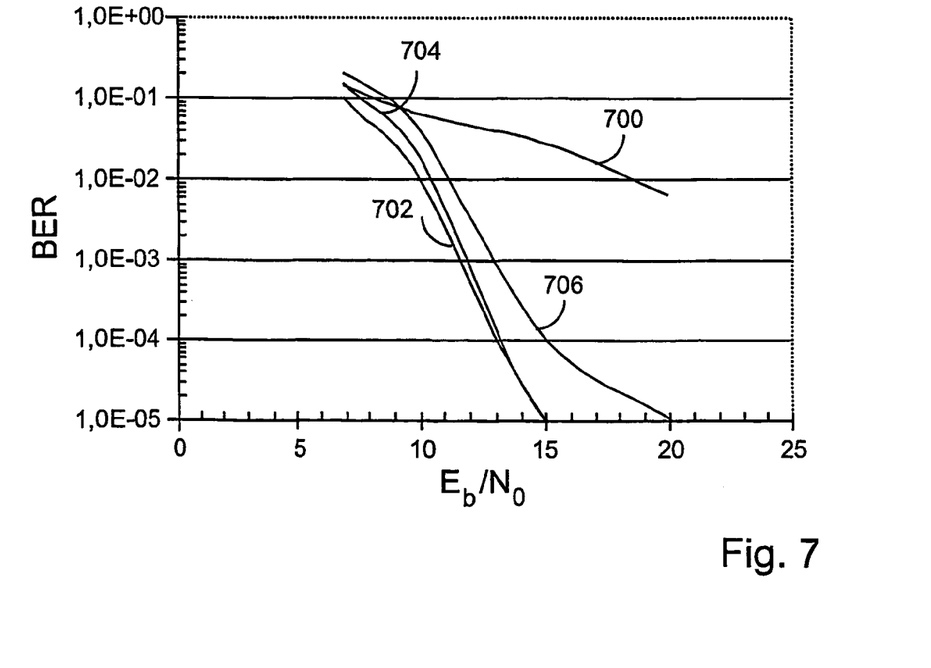
FIG. 7 shows an example of a simulation result.

FIG. 7 illustrates an example of simulation results of the above-described interference attenuation method. FIG. 7 shows curves of the bit error ratio. The vertical axis shows the number of incorrect bits of all received bits, and the horizontal axis shows the ratio of the received bit energy to the noise energy. The simulated system is a DS/FS system, i.e. a direct sequence frequency hopping system. The length of the spreading code is 63 chips and the modulation method is BPSK (binary phase shift keying). The length of the frequency hopping is 100 bits. The interfering signal is also frequency-hopping, and its intermediate frequency is converted hop by hop. The interfering signal is a square pulse BPSK signal (SQ BPSK). A curve 700 describes performance of one of the interference attenuations according to the prior art. The method used is an RLS (Recursive Least Squares) filter. A curve 702 describes performance of one embodiment of the above-described interference attenuation method when the length of the received signal block is 5 samples; a curve 704 describes performance of one embodiment of the above-described interference attenuation method when the length of the received signal block is 8 samples; a curve 706 describes performance of one embodiment of the above-described interference attenuation method when the length of the received signal block is 11 samples.

FIG. 7 shows that the performance of the interference attenuation method according to one embodiment of the invention is better than that of the prior art system, particularly when the signal-noise ratio increases. The figure also shows that changing the length of the received signal block to be processed, and at the same time, changing the length of the sample window can affect the performance of the method. The length of the sample block giving the best performance depends on both the system that is the object of interference and the interfering system.

Although the invention is described above with reference to the example according to the attached drawings, it will be obvious that the invention is not restricted thereto but can be modified in a plurality of ways within the inventive idea of the attached claims.

The invention claimed is:

1. A method, comprising:

setting an interference level threshold;

sampling the received signal;

storing the sample values as first sample value vectors of a predetermined length, forming prediction matrices of the first sample value vectors;

modifying prediction matrices in such a way that the interference components and the components of the desired signal are separated from each other;

forming signal matrices by performing rank reduction for each prediction matrix by rejecting those sample values or elements representing them that exceed the interference level threshold;

forming second sample value vectors of the signal matrices, the second sample value vectors being at least substantially of the same length as the first sample value vectors; and summing up sample values of the second sample value vectors time-coherently to average the noise by sliding the sample value window, the length of which is determined by the length of the first sample value vectors, to be used to attenuate interference in a system.

2. The method according to claim 1, wherein the interference level threshold is solid.

3. The method according to claim 1, wherein the interference level threshold is changeable.

4. The method according to claim 1, further comprising setting the interference level threshold on the basis of measurements performed of the channel.

5. The method according to claim 1, further comprising determining the length of the sample value vectors by the length of the spreading code.

6. The method according to claim 1, further comprising forming the prediction matrices by means of the sample value vectors and their complex conjugates.

7. The method according to claim 1, further comprising performing the rank reduction of the matrix by utilizing the Eckhart-Young theorem.

8. The method according to claim 1, further comprising sliding the sample value window by one or more sample values at a time.

9. The method according to claim 1, further comprising performing the separation of the interference components and the desired-signal components by diagonalization.

10. The method according to claim 1, further comprising performing the separation of the interference components and the desired-signal components by factorization.

11. A receiver, comprising:
a setting unit configured to set an interference level threshold;
a sampling unit configured to sample the received signal;
a storing unit configured to store the sample values as first sample value vectors of a predetermined length;
a forming unit configured to form prediction matrices of the first sample value vectors;
a modifying unit configured to modifying prediction matrices in such a way that the interference components and the components of the desired signal are separated from each other;
a forming unit configured to form signal matrices by performing rank reduction for each modified prediction matrix by rejecting those sample values or elements representing them that exceed the interference level threshold;
a forming unit configured to form second sample value vectors of the signal matrices, the second sample value vectors being at least substantially of the same length as the first sample value vectors; and
a summing unit configured to sum up sample values of second sample value vectors time-coherently to average the noise by sliding the sample value window, the length of which is determined by the length of the first sample value vectors, to be used to attenuate interference in a system.

12. The receiver according to claim 11, wherein the interference level threshold is fixed.

13. The receiver according to claim 11, wherein the interference level threshold is changeable.

14. The receiver according to claim 11, wherein the interference level threshold is set on the basis of the measurements performed of the channel.

15. The receiver according to claim 11, wherein the length of the sample value vectors is determined by the length of the spreading code.

16. The receiver according to claim 11, wherein the prediction matrices are formed by means of sample value vectors and their complex conjugates.

17. The receiver according to claim 11, wherein the rank reduction of the matrix is performed by utilizing the Eckhart-Young theorem.

18. The receiver according to claim 11, wherein the sample value window is slid by one or more sample values at a time.

19. The receiver according to claim 11, wherein the separation of the interference components and the desired-signal components is performed by diagonalization.

20. The receiver according to claim 11, wherein the separation of the interference components and the desired-signal components is performed by factorization.

21. An apparatus comprising:
means for setting an interference level threshold;
means for sampling the received signal;
means for storing the sample values as first sample value vectors of a predetermined length;
means for forming prediction matrices of the first sample value vectors;
means for modifying prediction matrices in such a way that the interference components and the components of the desired signal are separated from each other;
means for forming signal matrices by performing rank reduction for each modified prediction matrix by rejecting those sample values or elements representing them that exceed the interference level threshold;
means for forming second sample value vectors of the signal matrices, the second sample value vectors being at least substantially of the same length as the first sample value vectors; and
means for summing up sample values of second sample value vectors time-coherently to average the noise by sliding the sample value window, the length of which is determined by the length of the first sample value vectors, to be used to attenuate interference in a system.

* * * * *